United States Patent [19]

Hirayoshi

[11] Patent Number: 4,768,175

[45] Date of Patent: Aug. 30, 1988

[54] APPARATUS FOR MEASURING THE INTENSITY OF A SEISMIC SHOCK

[75] Inventor: Yoshio Hirayoshi, Sakae, Japan

[73] Assignee: Sanko Giken Co. Ltd., Tokyo, Japan

[21] Appl. No.: 6,143

[22] Filed: Jan. 23, 1987

[51] Int. Cl.$^4$ .............................................. G01V 1/00
[52] U.S. Cl. ..................................... 367/178; 73/649; 33/1 HH; 367/13
[58] Field of Search ................... 367/140.13, 178, 179, 367/182, 183, 184, 185, 186, 187, 188; 181/122; 73/649, 652, 653, 650, 660; 33/1 H, 1 HH, 391, 365, 368, 369, 398–402; 346/33 C

[56] References Cited

U.S. PATENT DOCUMENTS

| | | | |
|---|---|---|---|
| 4,117,496 | 9/1978 | Sattaripour | 367/179 |
| 4,280,206 | 7/1981 | Guralp | 367/179 |
| 4,615,022 | 9/1986 | Muramatsu | 181/122 X |

Primary Examiner—Deborah L. Kyle
Assistant Examiner—Brian Steinberger
Attorney, Agent, or Firm—Edward H. Loveman

[57] ABSTRACT

This is an apparatus for measuring the intensity of a seismic shock applied to the apparatus. The apparatus includes an enclosure in which is a system of weights movable in response to an applied mechanical shock, and connected to a movable transmission member. The transmission member contacts a first spiral cam rotatably mounted on a balanced rockable lever. The cam turns the lever angularly when the transmission member is moved by the weights. A spring connected to the lever tends to inhibit it from turning out of its balanced position when the transmission member moves. A second spiral cam is also rotatably mounted on the lever. A fixed stop member contacts the second cam to prevent the lever from turning back to its original balanced position when the lever is turned out of this position in response to an applied mechanical shock. An index needle connected to the lever indicates on a scale the amount that the lever has turned. A reset mechanism may also be provided to reset the lever to its original balanced position and to reset the index needle to starting position on the scale.

15 Claims, 6 Drawing Sheets

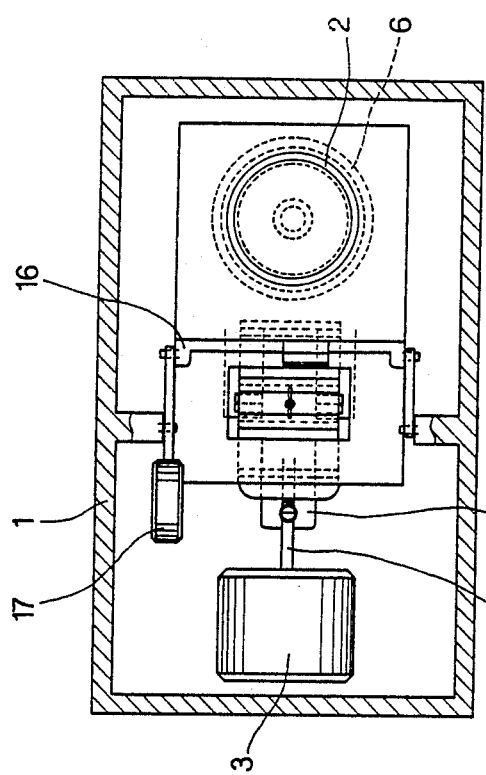
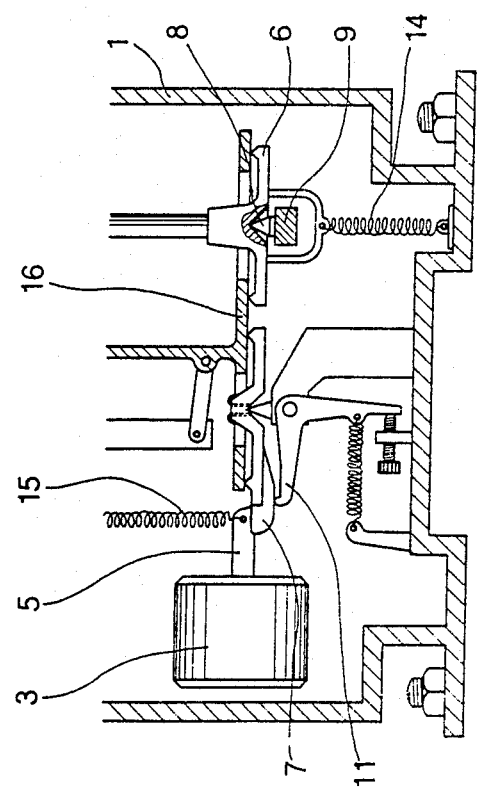
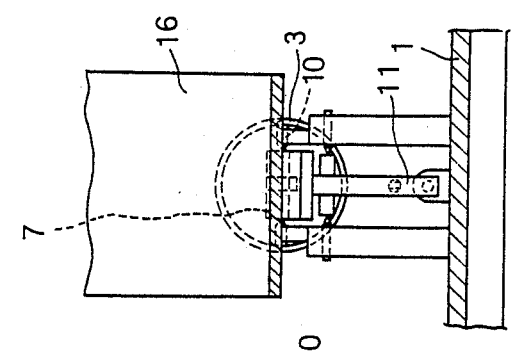
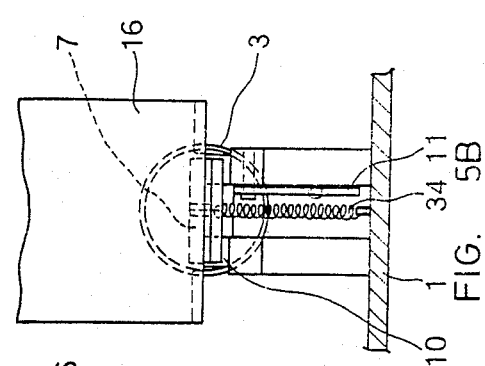
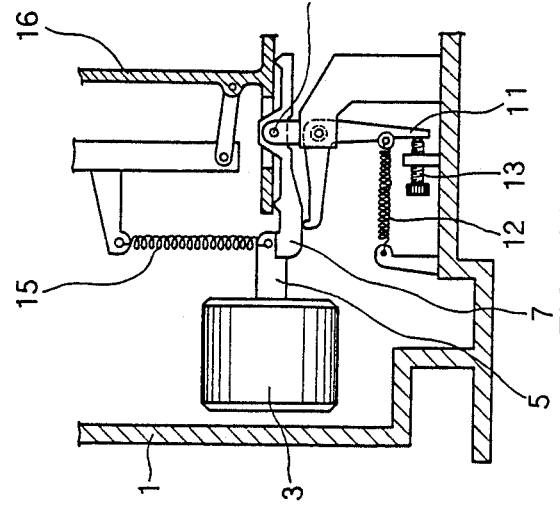
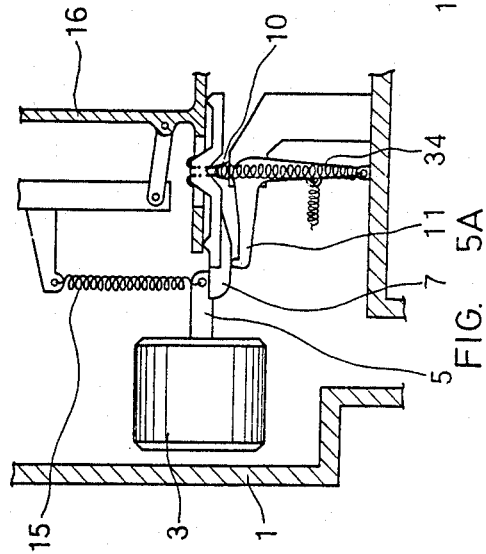

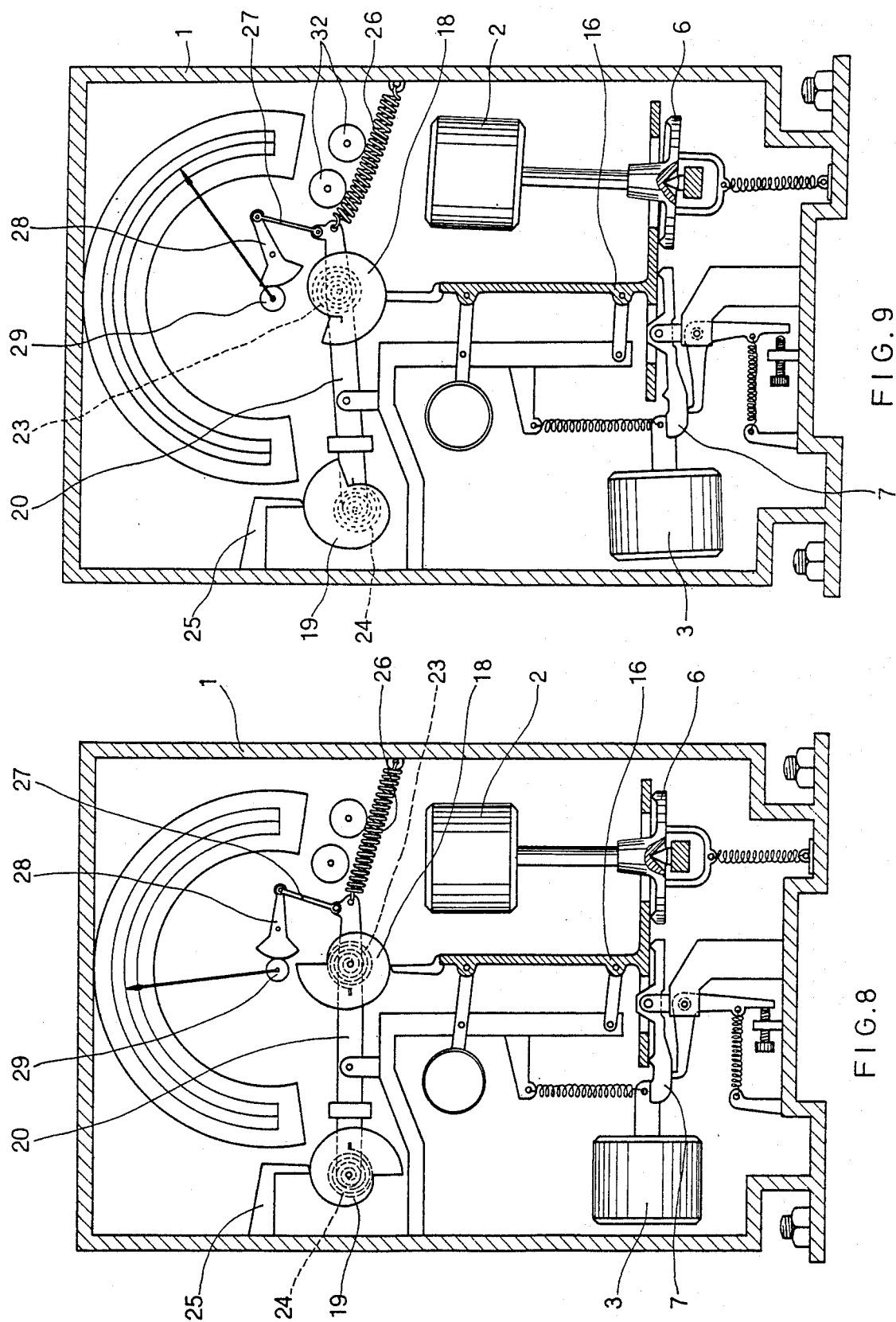

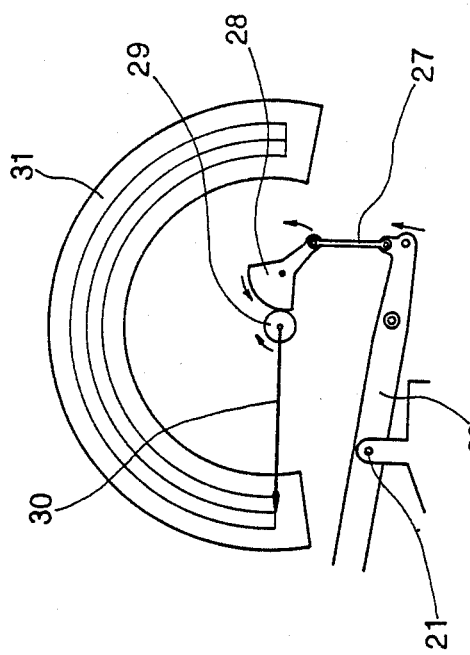
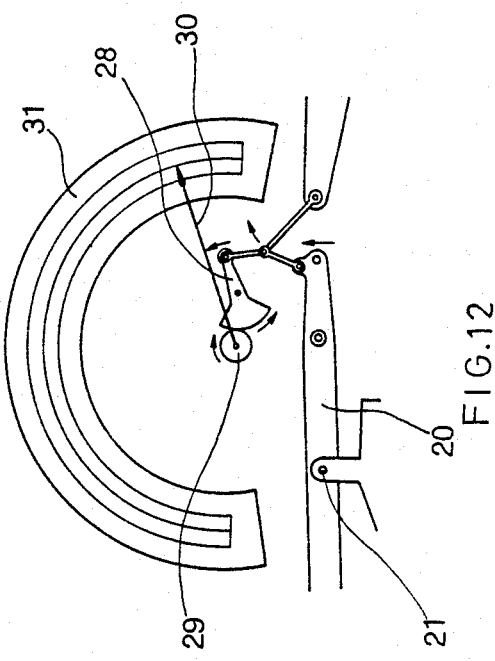
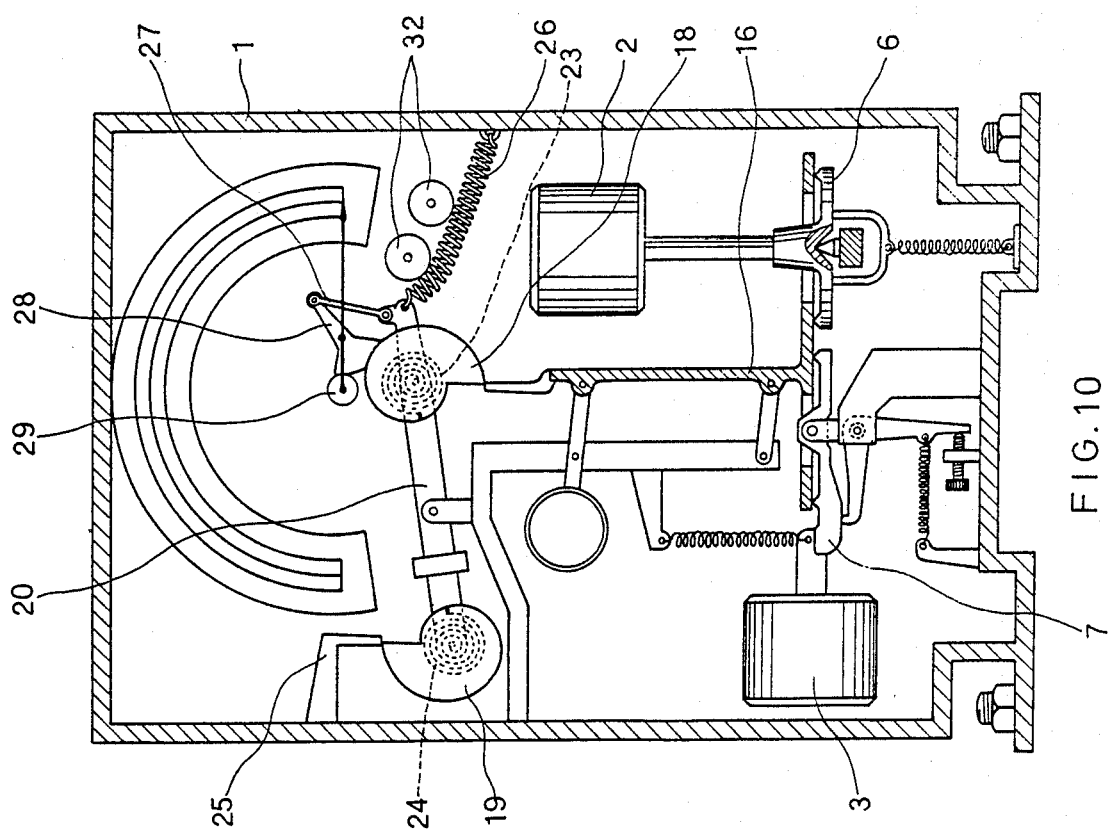

APPARATUS FOR MEASURING THE INTENSITY OF A SEISMIC SHOCK

BACKGROUND OF THE INVENTION

1. Field of the Invention

This invention relates to the art of seismographic measuring devices, and more particularly concerns apparatus for measuring the intensity of a seismic shock, such as a shock produced by an earthquake.

2. Description of the Prior Art

It is very difficult to precisely determine the intensity of a seismic shock because it is dependent on so many various factors. That is, seismic intensity is dependent on such factors as amplitude, frequency, acceleration, time, wavelength, wave shape, phase, wave envelope, vibration direction, transient phenomena and resonance, and thus, it is impossible to express seismic shock intensity in terms of a single physical quantity. Heretofore, there has been no reliable mechanical apparatus for indicating precisely on a graduated scale the intensity of a seismic shock, taking into account all or most of the important factors heretofore mentioned.

SUMMARY OF THE INVENTION

Accordingly, the principal object of the present invention is to provide apparatus for precisely indicating the intensity of seismic shock. In accordance with the present invention, such apparatus includes a system of weights which move relative to the earth during an earthquake. The weight system is connected to a transmission member which transmits the relative movement of the weight system in a single direction. The transmission member contacts a first spiral cam which is urged by a coil spring to rotate in one direction. The cam is rotatably mounted on a balance lever and turns the lever when the transmission member moves in response to movement of the weight system during the occurrence of a seismic shock or earthquake. Another coil spring is connected to the lever and tends to inhibit it from turning out of its original, static, balanced position, but this spring does not prevent the lever from turning when the transmission member is moved by the weight system in response to a seismic shock. A second spiral cam is also rotatably mounted on the lever and is urged to turn by a further coil spring in the same direction as the first cam. The second cam contacts a stop member which prevents the lever from returning to its original balance position when the transmission member is moved by the weight system. An index needle is operatively connected to the lever via a gear train to indicate on an adjacent scale the extent of turning movement of the lever in response to a seismic shock. Both the index needle and the lever remain in fixed positions after the intensity of a seismic shock has been indicated. A manually operable reset mechanism is further provided to restore the lever to its original balanced position and to restore the index needle to its original starting position.

By means of the apparatus of the present invention the intensity of a seismic shock can be precisely indicated.

BRIEF DESCRIPTION OF THE DRAWINGS

FIG. 4A and FIG. 5A are fragmentary vertical sectional view both similar to a portion of FIG. 1, but showing positions assumed by one of the weights and associated parts during an earthquake.

FIG. 4B and FIG. 5B are side views taken at an angle of 90 degrees to FIGS. 4A and 5A respectively.

FIG. 5C is a fragmentary horizontal sectional view similar to FIG. 3 and showing parts as displaced during an earthquake.

FIG. 5D is a fragmentary vertical sectional view similar to portions of FIG. 1 and FIG. 5A showing parts as displaced during an earthquake.

FIGS. 6, 8, 9, and 10 are views similar to FIG. 1 showing positions of parts assumed during earthquakes of progressively increasing severity.

FIG. 11 is a front elevational view of the index needle, scale and associated parts prior to displacement by an earthquake shock.

FIG. 12 is a view similar to FIG. 11 showing positions assumed by the index needle and associated parts during an earthquake.

DETAILED DESCRIPTION OF THE PREFERRED EMBODIMENTS

The measurement of seismic shock intensity is influenced by various factors. Three of these factors have been identified as sufficient to serve as a basis for a precise seismic shock intensity measurement system. These major factors are amplitude, acceleration, and time duration of the seismic shock.

Amplitude determines how much the ground and objects on it such has buildings shake; thus, amplitude is a major cause of damage due to an earthquake.

Acceleration is a measure of how much force is applied to buildings and other objects during an earthquake and is thus, another major cause of damage due to an earthquake.

Time duration of the earthquake is related to damage, since the damage caused by an earthquake will be small if the time duration is very short, and the damage will be severe if the time duration of the earthquake is long. Thus, time duration is a third fundamental factor to be taken into account in measuring seismic shock intensity.

Minor factors such as frequency of vibration, wavelengths of shock waves, shape of the mechanical shock waves, phase, (i.e. time the lag in movement of the ground following the inception of an earthquake shock wave), wave envelope, direction of travel of the shock wave, mechanical resonance of buildings and other objects, and transient phenomena such as sudden changes in intensity of the mechanical shocks, are all related, and are mathematical and physical functions of the three fundamental factors: amplitude, acceleration, and time duration.

Accordingly, if a physical unit system is established in which these three fundamental factors are taken into consideration, the seismic shock intensity may well be defined by these three factors; so that the intensity of a seismic shock may be precisely measured.

By using the apparatus of the present invention, the three fundamental factors are taken into account and incorporated into a new unit system for measurement of seismic shock intensity. The manner by which the three fundamental factors influence the value which is determined by the apparatus of the present invention will become apparent by referring to the following description.

A preferred embodiment of the apparatus of the present invention will now be described with particular reference to the accompanying drawings.

Figure 1:
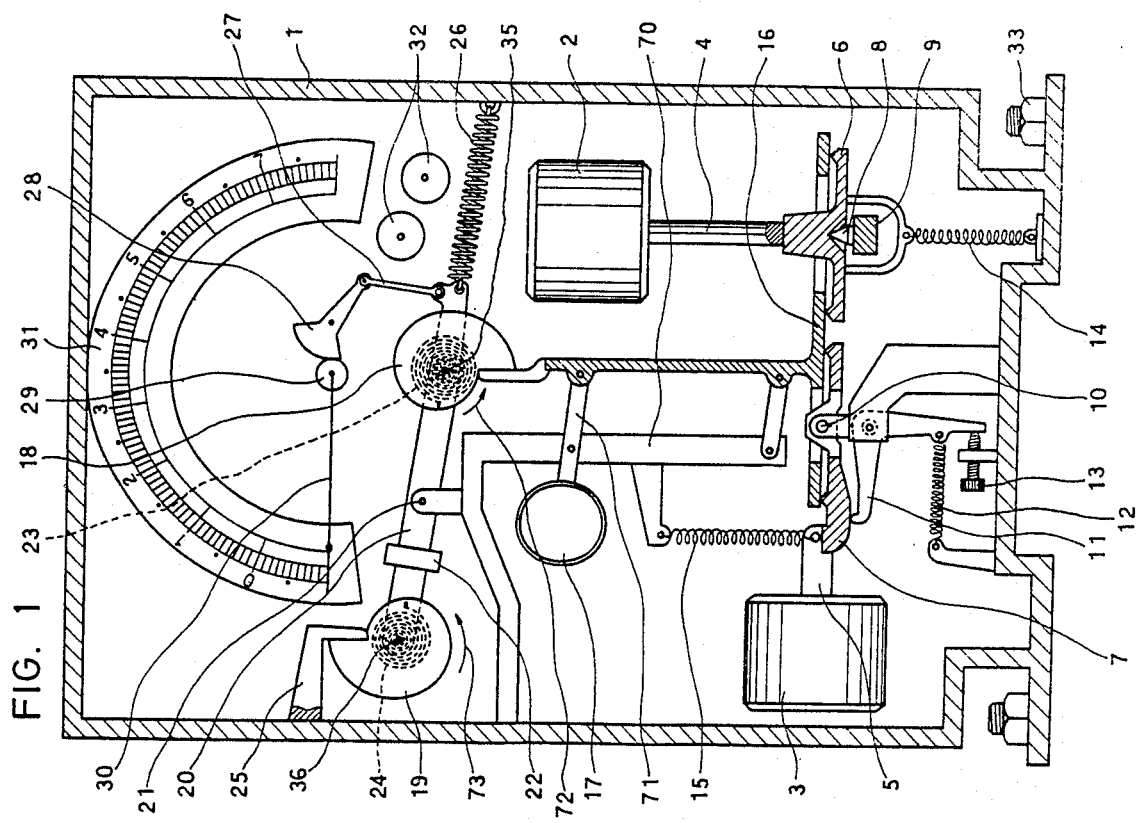
FIG. 1 is a vertical sectional view of an apparatus in upright position, embodying the invention.

Referring now to FIG. 1, the apparatus is enclosed in an enclosure 1 which is a closed rectangular casing fixed in an upright position by nuts and bolts 33 to the earth or to a building subject to mechanical shocks to be measured by the apparatus, which shocks are transmitted directly to the enclosure 1. The enclosure 1 shuts off the influence of wind and prevents direct contact with its interior by objects fixed from outside. The apparatus has a weight 2 which can move in every lateral direction, and a weight 3 which moves only in a vertical direction. The weights 2 and 3 do not move during an earthquake but the enclosure 1 and the other parts of the apparatus enclosed therein do move. However, for the purpose of easier comprehension, it will be stated throughout this specification that the weights move, and not the enclosure or parts of the apparatus therein. This should cause no problem or misunderstanding because the weights actually move with respect to the enclosure and the other parts of the apparatus therein. The weights 2 and 3 may be the same or of different shape, size, and weight, and three or more weights may be employed in the apparatus. Further, although it is preferred that the apparatus have both the weights 2, 3, for lateral and vertical shaking respectively, the seismic shock intensity may be substantially determined by employing only the weight 2 for lateral shaking so that an apparatus containing only one weight is within the scope of the present invention.

Figure 2:
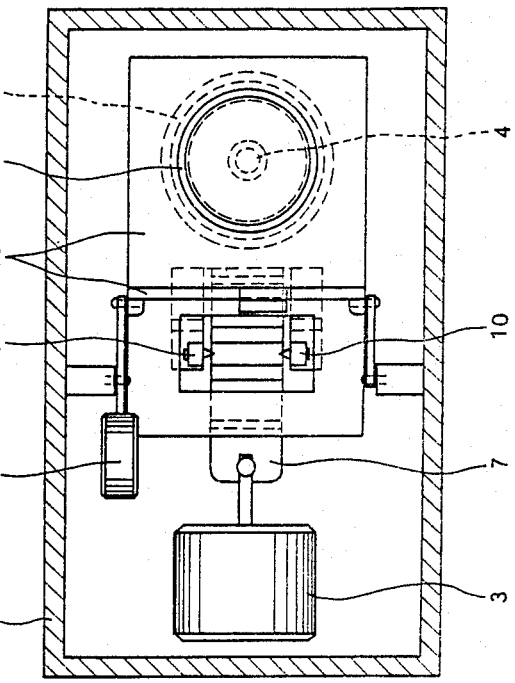
FIG. 2 is a fragmentary horizontal sectional view of an upper portion of the apparatus of FIG. 1, showing the rockable lever and associated parts.
Figure 3:
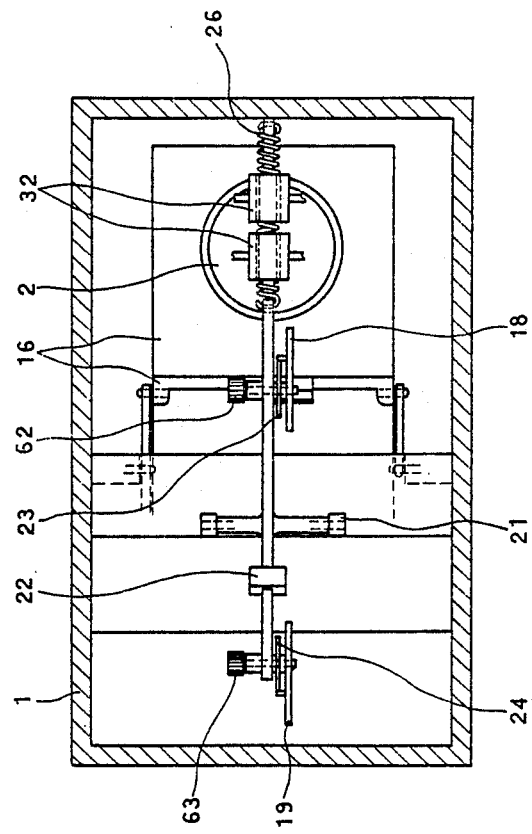
FIG. 3 is a fragmentary horizontal sectional view of a lower portion of the apparatus of FIG. 1, showing the transmission member and associated parts.

The weight 2 is connected to a vibration member 6 through a weight support 4. The vibration member 6 is mounted on a stationary fulcrum 8 of wedge shape supported by a stationary bar 9. The underside of the vibration member 6 is under tension imparted by a stretched spring 14 fixed to the enclosure 1, so that the weight 2 is stabley supported. As shown in FIG. 3 the shape of the vibration member 6 may substantially circular. The characteristic frequency of the weight 2 and support spring 14 should be distinctly lower than the frequency range of all earthquake shocks to be measured, so as to ensure that the vibration of the weight is not influenced by its characteristic frequency.

The weight 3 which is responsive to vertical shaking during an earthquake is connected to a vibration member 7 through a connecting rod 5. The vibration member 7 is pivotally mounted on a fulcrum 10. One end of a support spring 15 is connected to the connecting rod 5, and the other end thereof is connected to a fixed member 70 which is fixed to the enclosure 1. The weight of the weight 3 is balanced by the contracting force of the support spring 15, so that the vibration member 7 is held horizontally. As shown in FIG. 3, the shape of the vibration member 7 may be, for example, substantially rectangular. The vibration member 7 is mounted on the tip of a horizontal adjusting arm 11; see FIG. 1. The lower portion of the arm 11 is tensioned by a spring 12 fixed at one end to the enclosure 1, so that the lower portion of the arm 11 contacts an adjusting screw 13. Since, the contracting force of the support spring 15 may vary, depending on the ambient temperature or may change as time elapses, the horizontal position of the vibration member 7 may be adjusted by adjusting the screw 13.

A transmission member 16 is mounted on the vibration members 6 and 7. The transmission member 16 can move only in the vertical direction in view of a balancing weight 17 connected thereto via a connecting rod 71. The balancing weight 17 balances the transmission member 16. It is preferred that the balancing weight 17 and the transmission member 16 both be light. Since the weight of the transmission member 16 is offset by the balancing weight 17, the transmission member 16 contacts the vibration members 6 and 7 very slightly.

A seesaw type lever 20 is pivotally or rockably mounted by a shaft pin 21 to turn angularly in a vertical plane, on the fixed member 70. A first spiral cam 18 is rotatably mounted on one end portion of the lever 20 central bearing 35. On the other end portion of the lever 20 is mounted a second spiral cam 19 rotatably journaled on a central bearing 36. Both of the cams 18 and 19 rotate in a vertical plane on horizontal axes of the bearings 35 and 36. The first and second cams 18 and 19 are both urged to rotate counterclockwise as viewed in FIG. 1, by respective coiled hair springs 23 and 24, as indicated by respective arrows 72 and 73. The first cam 18 contacts the tip of the transmission member 16, and the second cam 19 contacts a stopper 25 fixed to the enclosure 1. Since the peripheries of the spiral cams 18 and 19 gradually and smoothly increase in radius from minimum to maximum clockwise as viewed in FIG. 1, the tip of transmission member 16 and the tip of stopper 25 contact peripheral points of progressively larger radius of the respective cams as the cams turn counterclockwise in the direction of arrows 72, 73. Since the power of the hair springs 23 and 24 is very small, the first and second cams 18 and 19 do not rotate when they contact the transmission member 16 or the stopper 25, respectively, because of the friction thereinbetween.

At the end portion of the lever 20 at which the cam 18 is mounted, is connected one end of a main coil spring 26 which serves as a balancing means for the lever 20. The other end of the spring 26 is fixed to the enclosure 1. The spring 26 prevents turning movement of the lever 20 when the apparatus is in static condition as shown in FIG. 1. At other times, the spring 26 only tends to inhibit turning movement of the lever 20. A pair or compensation rollers 32 are provided adjacent to the spring 26, the function of which will be described later in detail. A balancing weight 22 is mounted on the lever 20 to balance the same. A rod 27 is connected to the end of the lever 20 adjacent the spring 26. The angular turning movement of the lever 20 in either direction in a vertical plane is transmitted to an index needle or pointer 30 through a fan-shaped gear 28 and a pinion gear 29. The index needle 30 moves counterclockwise along an arcuate granduated scale 31 until it stops to indicate a seismic shock intensity. In the static condition of the apparatus as shown in FIG. 1, the index needle 30 is located in starting position at the extreme left end of the scale 31.

FIGS. 4A and 4B show the weight 3, the vibration member 7, the fulcrum 10 and the adjusting arm 11. The vibration member 7 is pivotally supported on the fulcrum 10. As shown in FIGS. 5A and 5B, the vibration member 7 may be supported on an edge of the fulcrum 10 which may have a triangular shape. In this embodiment, the vibration member 7 may be held under tension of a stabilizing spring 34 attached to the base of the enclosure 1.

FIG. 1 shows the normal static state of the apparatus. If an earthquake occurs, the weight 2, and/or the weight 3 move in response to lateral or vertical shaking of the apparatus. The movement of the weights 2 and/or 3 push the transmission member 16 up vertically with respect to the base of the enclosure to rotate the lever 20. This motion will now be described in further detail with reference to FIGS. 7A to 7E, which show the various states of the first and second cams 18 and 19, and the lever 20.

Figures 7A, 7B, 7C, 7D, 7E:
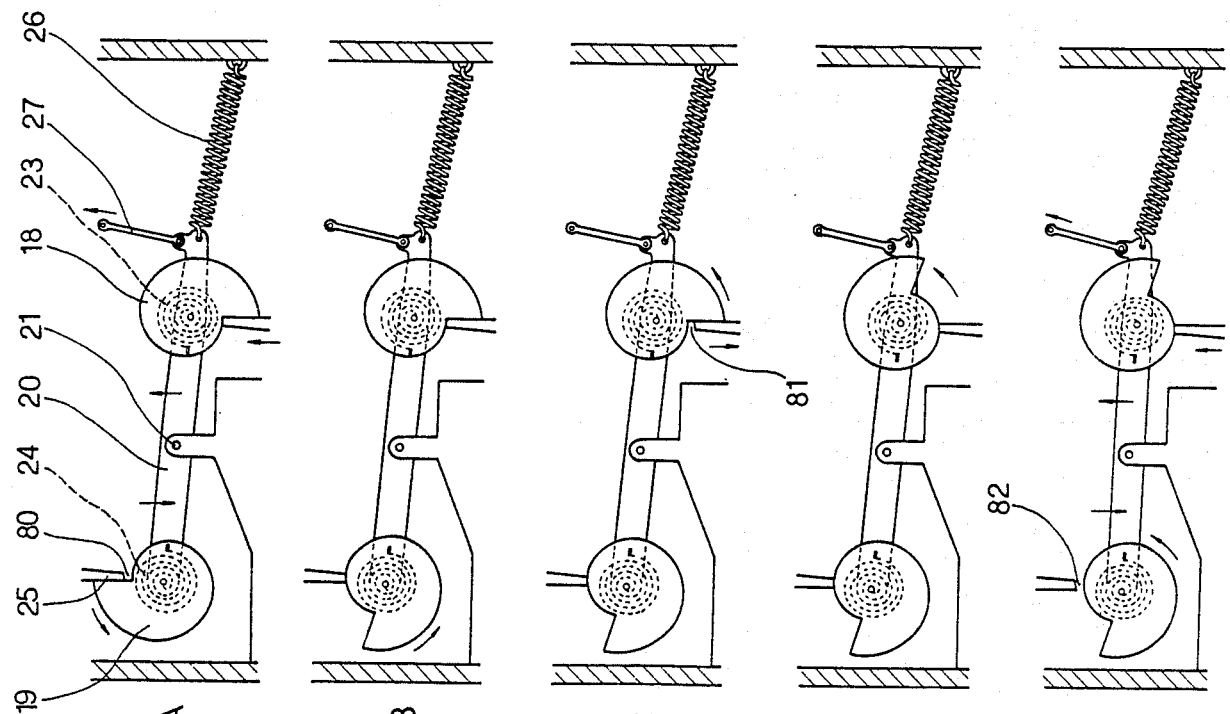
FIGS. 7A through 7E are fragmentary vertical sectional views similar to a portion of FIG. 1, but showing successive positions assumed by various parts during an earthquake.
Figure 6:
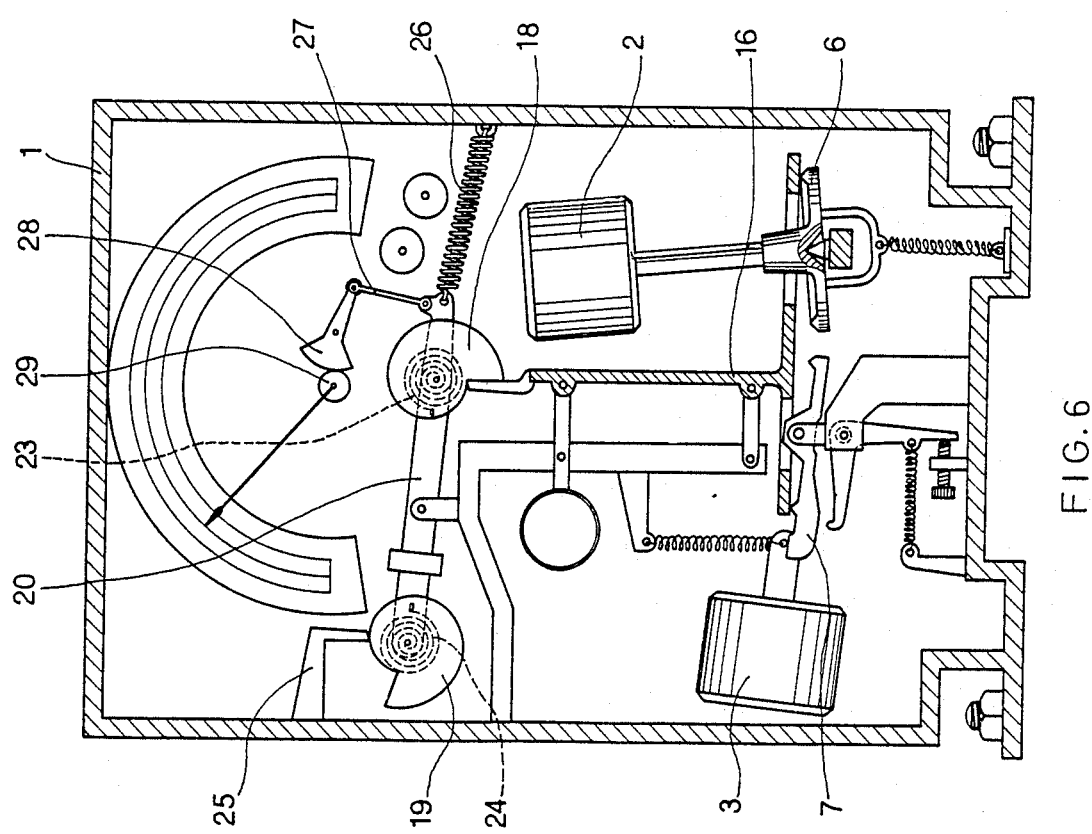

The first shake of the earthquake moves the weights 2 and 3 to push the transmission member 16 upwardly, and the transmission member 16 in turn pushes up the cam 18 to rotate the lever 20 counterclockwise around the pin 21 as shown in Fig. 7A to provide a gap 80 between the cam 19 and the tip of the stopper 25. Since the cam 19 is thus freed, it is rotated by the hair spring 24 counterclockwise as shown by the counterclockwise arrow in FIG. 7A.

Since the cam 19 has a spiral shape, and is rotated counterclockwise by the hair spring 24, the tip of the stopper 25 will again contact the second cam 19 after some rotation of the cam 19, as shown in FIG. 7B. Upon contact with the stopper 25, rotation of the second cam ceases, because of the friction between the second cam 19 and the stopper 25.

When the peak of the earthquake shock passes, the weights 2, 3, will return to their original stable, balanced, static position shown in FIG. 1; and the vertical transmission member 16 will be lowered to its original stable position, to provide a gap 81 between the tip of the transmission member 16 and the first cam 18 as shown in FIG. 7C. The first spiral cam 18 is thus freed, and as a result, the cam 18 is rotated counterclockwise by the hair spring 23 as indicated by a counterclockwise arrow in FIG. 7C.

Since the first cam 18 has a spiral shape, and is rotated counterclockwise, the first cam 18 again contacts the tip of the transmission member 16 after some rotation at a point where the radius of the cam is between minimum and maximum, as shown in FIG. 7D. Upon contact with the tip of the transmission member 16, rotation of the first cam 18 ceases because of the friction between the first cam 18 and the tip of the transmission member 16.

If the earthquake continues, the transmission member 16 again pushes up the first cam 18 to provide a gap 82 between the second cam 19 and the tip of the stopper 25 as shown in FIG. 7E. This state corresponds to the state shown in FIG. 7A, and the aforementioned cycle is repeated.

Thus, if the earthquake continues, the lever 20 is gradually rotated counterclockwise, in the direction in which the first cam 18 is lifted up and the second cam 19 is lowered.

With the rotation of the lever 20, the contracting force of the main spring 26 becomes large, so that the rotation of the lever 20, is stopped at a point where the upward force by the transmission member 16 is balanced by the contracting force of the main spring 26, which is illustrated in FIG. 8. However, if a stronger shock comes, the transmission member 16 again pushes up the first cam 18 overcoming the contraction force of the main spring 26, as shown in FIG. 9.

Since the possible range of acceleration produced by the earthquake shock is very large, it is difficult to balance the rotating power of the lever 20 with one simple spring. More particularly, if a strong spring is used as the main spring 26, a strong earthquake shock may be measured but a weak earthquake shock cannot be measured. If a weak spring is used as the main spring 26, a weak earthquake shock may be measured but strong earthquake shocks cannot be measured. To solve this problem, compensation rollers 32 are provided in the vicinity of the main spring 26. As the lever 20 rotates, the main spring 26 contacts the compension rollers 32, whereupon the resistance of the main spring 26, is drastically increased (see FIG. 10). Thus, if a weak spring is used as the main spring 26, and the compensation rollers 32 are provided, both weak and strong earthquake shocks can be measured. This is because the weak earthquake shock is measured before the main spring 26 contacts the compensation rollers 32, and the strong earthquake shock is measured after the main spring 26 contacts the compensation rollers 32. It is preferred that the positions of the compensation rollers be changeable so that the degree of the increase of the contracting force of the main spring 26 after contacting the compensation rollers 32 may be adjusted. Obviously, instead of using the compensation rollers 32 a plurality of springs whose strengths are different from each other may be utilized.

After the earthquake ceases, the maximum seismic shock intensity reached may be determined from the index 30 and the scale 31. When the first cam 18 contacts the tip of the transmission member 16, and the second cam 19 contacts the tip of the stopper 25, the lever 20 is fixed in position, and in turn the index 30 are fixed at a certain position indicating on the scale 31 the magnitude of the highest shock intensity reached.

As mentioned above, the seismic shock intensity can be defined by the amplitude, acceleration and time factors (duration). The above described apparatus uses these three factors to measure the maximum seismic shock intensity attained by an earthquake.

The greater the amplitude of the earthquake, the greater the movements of the weights 2 and 3 and the transmission member 16, and in turn the rotation of the lever 20. Thus, the amplitude of the earthquake is reflected in the seismic shock intensity indicated by the index needle 30 on the scale 31.

As to the acceleration, if the acceleration is great, the power transmitted to the transmission member 16 and in turn to the lever 20 is great, so that the lever 20 is largely rotated overcoming the resistance by the main spring 26. If the acceleration is small, the transmission member 16 cannot push up the lever 20 very much because of the resistive force of the main spring 26. Thus, the seismic shock intensity determined by the apparatus of the present invention reflects the acceleration of the earthquake. As to the time, duration of the earthquake, the longer the duration of the earthquake, the more transmission member 16 moves up and down, and the more the lever 20 rotates. Thus, the seismic shock intensity as measured by the present invention reflects the time duration of the earthquake.

The seismic shock intensity determined by the apparatus of the present invention is defined by the combination of the three fundamental factors, abovementioned.

The indicator of the apparatus will now be described in more detail. According to the embodiment shown in FIG. 1, the movement of the lever 20 is transmitted to a fan-shaped gear 28 through a connecting rod 27. The rotation of the fan-shaped gear 28 rotates a pinion 29 meshed with the fan-shaped gear 28 to swing the index 30. Thus, there is a linear relationship between the rotation of the lever 20 and the swing of the index 30. However, since seismic shock intensity is a logarithmic value, the low range portion of the scale 31 must be densely graduated, so that reading the scale in the low range portion is troublesome. Therefore, it is preferred that the angular turning movement of the index needle 30 be large in seismic shock intensity of low range and the angular turning movement be small for seismic shock intensity of high range.

FIG. 11 shows an embodiment accomplishing this purpose. As shown in FIG. 11, both of the fan-shaped gear 28 and the pinion 29 are eccentric such that in the low range, the index needle 30 swings are large with respect to the movement of the connecting rod 27, while in the high range, the swings of the index needle 30 are small with respect to the angular turning movement of the lever 20.

Another embodiment for accomplishing this function is shown in FIG. 12. In this embodiment, the middle portion of the connecting rod 27 is bent when the lever 20 makes large angular turning movements. According to this embodiment, when the angular turning movement of the lever 20 is small, the index 30 swings substantially linearly with the movement of the lever 20. On the other hand, when the angular turning movement of the lever 20 is large, the connecting rod 27 is bent at its middle portion, so that the movement of the lever 20 is only partly transmitted to the fan-shaped gear 28 to decrease the movement of the index needle 30 with respect to the movement of the lever 20.

An example of a reset device will not be described with reference to FIGS. 13A and 13B. After the seismic shock intensity indicated on the scale 31 is read, the apparatus must be restored to its original state as shown in FIG. 1. As mentioned above, after the measurement of the seismic shock intensity, the lever 20 is locked, and the reset device should not be actuated. This prevents one from inadvertently putting back the index needle 30 before reading the indicated value, and prevents the reset device from being automatically actuated by, for example, some shock applied to the apparatus during the earthquake. Thus, a reset device which can be operated too easily is not appropriate.

Figure 13A:
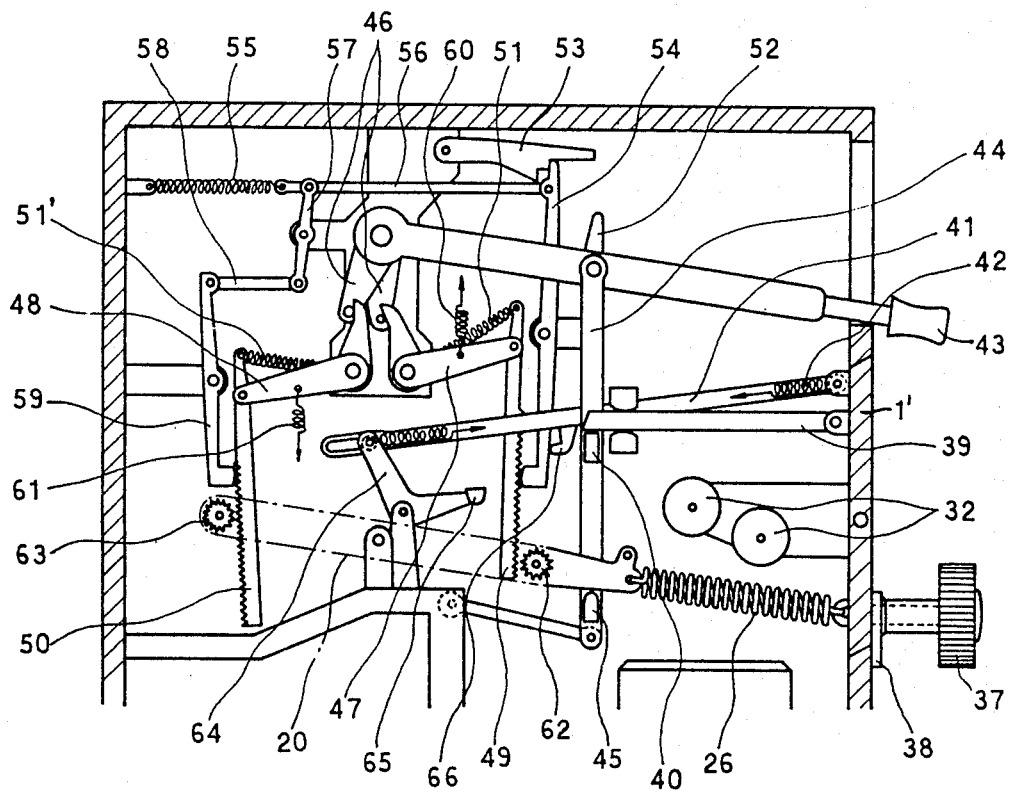
FIG. 13A and 13B are fragmentary front elevational views of the apparatus showing the reset assembly and associated parts in different positions prior to reset and during reset respectively.
Figure 13B:
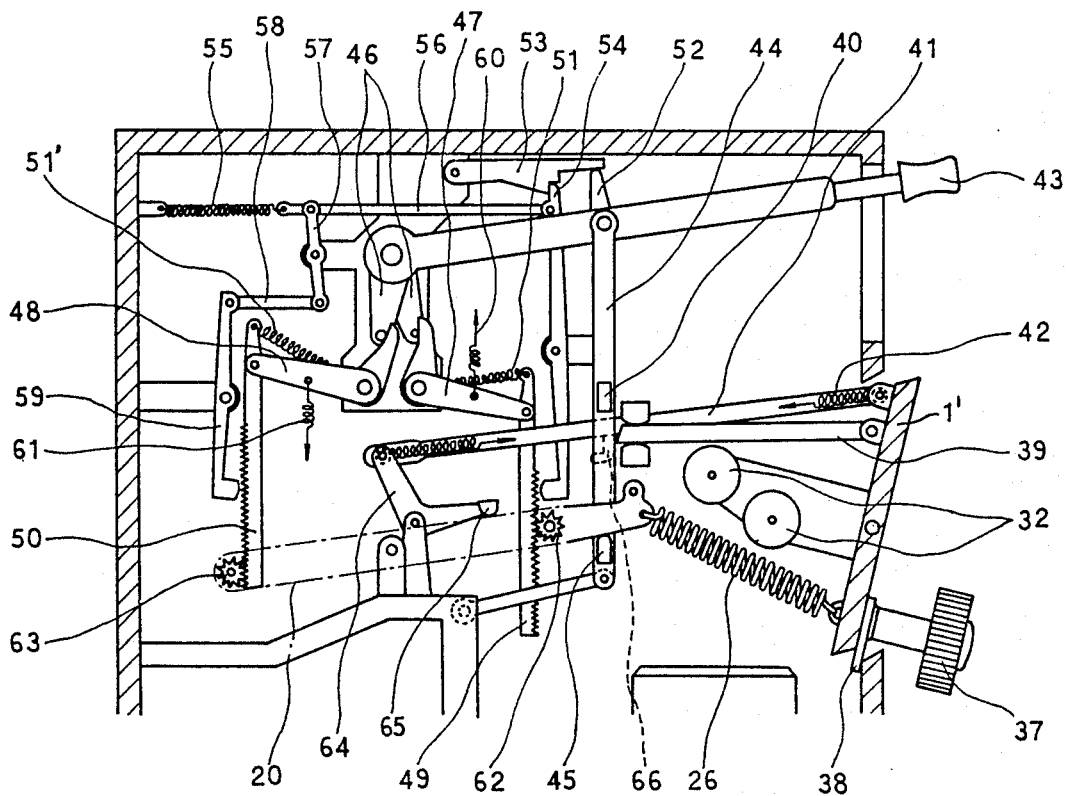

The structure of the reset device shown in FIGS. 13A and 13B will not be described in conjunction with the resetting operation. First of all, a reset button 37 is rotated to change the direction of a lock key 38 to open and dislocate a hinged tilting wall portion 1' of the enclosure 1 on which portion one end of the main spring 26 is fixed thereby relieving the main spring 26, and freeing the compensation rollers 32. At the same time, a reset lock 39 is drawn back and a lock arm 40 is freed. Further a damper rod 41 and a damper spring 42 contained therein are pulled and drawn back.

Next, a reset lever 43 is lifted up carrying a lifter arm 44 and 45 a lifter lock to lift up the end portion of the lever 20 to its upper most position. Further, one of a pair of rest cranks 46 provided at the end portion of the reset lever 43 lowers a right rack arm 47 and the other crank 46 lifts the left rack arm 48. When the reset lever 43 is lifted up as far as it goes, a lever projection 52 pushes up an arm stopper 53 to free the upper end of a right rack set arm 54, which is then pulled by an arm spring 55 to the left side in FIG. 13A, so that a right rack set arm 54 is disengaged from a right rack gear 49. A reverse crank 57 connected to the arm rod 56 is also moved to disengage a left rack set arm 59 via a connecting rod 58 from a rack gear 50.

Thus, the rack set arms 54 and 59 are disengaged from the respective rack gears 49 and 50. Due to the contracting force of the springs 51 and 51', the rack gears 49 and 50 mesh with a cam pinions 62, 63, respectively, as illustrated in FIG. 13B.

Next, the reset lever 43 is gradually lowered to rotate reset cranks 46, so that the right rack gear 49 is lifted by a right rack arm spring 60, and the left rack gear 50 is lowered by a left rack arm spring 61.

When the reset lever 43 is lowered, the lifter arm 44 is also lowered, so that the right side of the lever 20 is also lowered. At this time, a damper 64 rotates in the clockwise direction due to the contracting force of the damper spring 42, and the lever 20 is pushed down by a damper head 65.

Due to the reversion of the lever 20 to its original state, the cam pinion 62 is lowered and the right rack gear 49 is lifted up. On the other hand, the cam pinion 63 is lifted up and the left rack gear 50 is lowered. Accordingly, both of the cam pinions 62 and 63 reverse to their original positions as shown in FIG. 13A, while rotating in the clockwise direction. At this time, the cams 18 and 19 also rotate in the clockwise direction (opposite direction in the measuring step) to get back their original positions shown in FIG. 1.

Since, the weights 2 and 3, the vibration members 6 and 7, and the transmission member 16 are in free state, they tend to be shaken during the resetting procedure, so that it is hard to restore the lever 20 and the cam 18 to their original positions shown in FIG. 1. To solve this problem, the damper 64 is provided, to prevent the lever 20 from being shaken. The lever 20 is pushed down by the damper head 65, so that the transmission member 16 and weights 2 and 3 are not disturbed.

When the reset lever 43 is lowered as far as it goes, and then the dislocated portion 1' of the enclosure 1 is restored to its original position as shown in FIG. 13A the apparatus is restored to its normal state showing in FIGS. 1 and 13A, and is ready for measuring the next earthquake shock.

Although the structure of the reset device may seem complicated, the resetting operation is relatively simple because it consists of four steps, i.e. dislocating the tilting portion 1 of the enclosure, lifting up the reset lever 43, lowering the reset lever 43, and finally putting back the disclosed portion 1' of the enclosure 1 to its original state.

Although the present invention has been fully described based on a preferred embodiment thereof, various modifications, omissions and additions without departing from the spirit and scope of the invention will be apparent to those skilled in the art. For example, the first and second cams 18 and 19 may be mounted on one side of the lever 20. The apparatus may preferably be provided with a level to assure that the apparatus is set up horizontally. Further, the swing of the index needle 30 may be utilized for operation of switches and stoppers, so that the apparatus of the invention may be employed with initiators of earthquake alarms, evacuation-inducing devices, controllers of gas valves and the like. Further if the apparatus is combined with a remote sensor, measurement of an earthquake at a distance may be conducted, so that the apparatus may be employed in an automatic controller system of a traffic system such as a railway systems. Still further, the apparatus of the present invention may be used for measuring or detecting mechanical shocks other than those of earthquakes such as shocks in vehicles including buses and trains, in areas along a railway, in factories and in construction sites.

As stated before in detail, by using the apparatus of the present invention, the amplitude, acceleration and time of an earthquake shock are precisely reflected in the magnitude of the seismic shock intensity as measured by the apparatus.

Since the apparatus of the present invention does not utilize electricity at all, the measurement of earthquake shocks can be continued even if a power failure is caused by an earthquake. Further, since the apparatus of the present invention does not utilize a battery, the measurement of an earthquake is possible even if the apparatus is left standing for a long time without maintenance.

I claim:

1. Apparatus for measuring the intensity of mechanical shocks, comprising:
   a support adapted for mounting in a stationary position for application thereto of a mechanical shock whose intensity is to be measured;
   a weight system carried by said support and movable with respect thereto in response to said shock when applied to said support;
   a lever pivotally mounted on said support to turn angularly;
   spring means connected to said lever and tending to hold the same in a static, balanced position with respect to said support;
   a first cam rotatably mounted on said lever;
   a transmission member movably connected to said weight system and operatively arranged to advance when said weight system moves in response to application of said shock to said support, said transmission member being disposed to contact said cam peripherally for turning said lever angularly out of said balanced position when said transmission member advances;
   a second cam rotatably mounted on said lever;
   a stop member fixed on said support and disposed to engage said second cam peripherally to prevent said lever from returning to said balance position after said lever is turned out of said balanced position; and
   an index member operatively connected to said lever to indicate intensity of said mechanical shock applied to said support, whereby said index member is held in a fixed position to continue indicating the intensity of said shock applied to said support after said shock has terminated.

2. Apparatus as defined in claim 1, wherein said support is an enclosure containing said weight system, lever, spring means, cams, transmission member, and stop member; and further comprising means for mounting said enclosure in fixed upright position on another support subject to said mechanical shocks for transmitting the same to said enclosure.

3. Apparatus as defined in claim 1, wherein said weight system comprises:
   a first weight movable in a horizontal plane for response to mechanical shocks directed laterally to said support; and
   a second weight movable in a vertical plane for response to shocks directed vertically with respect to said support.

4. Apparatus as defined in claim 2, further comprising:
   a lifter member contacting said lever and movable between upper and lower positions with respect to said lever;
   a reset lever connected to said lifter member for raising and lowering the same;
   first and second rack gears operatively connected to said reset lever and arranged to rotate said first and second cams respectively when said reset lever is lowered; and
   mechanical means operatively connected to said reset lever for restoring said first named lever to said balanced position.

5. Apparatus as defined in claim 4, wherein said enclosure has a tiltable wall portion, and wherein said spring means connected to said first named lever is a tensioned coil spring also connected to said tiltable wall portion of said enclosure to maintain said coil spring in tension when said wall portion is upright, said wall portion being arranged to relieve tension in said coil spring when said wall portion is tilted, so that said reset lever can be operated to restore said first named lever to said balanced position.

6. Apparatus as defined in claim 5, wherein said mechanical means comprises:
   a damper rod connected at one end to said tiltable wall portion of said enclosure; and
   a damper member connected to said damper rod to contact said first named lever for restoring the same to said balanced position when said reset lever is raised.

7. Apparatus as defined in claim 1, further comprising means constraining said transmission member to advance and retract vertically with respect to said support.

8. Apparatus as defined in claim 7, further comprising balancing means connected to said transmission member and arranged to balance the weight of said transmission member to maximize response of said weight system to shocks applied to said support.

9. Apparatus as defined in claim 1, further comprising a rod connected at one end thereof to said lever; and a gear train operatively connecting said rod and said index member for turning said index member when said lever turns.

10. Apparatus as defined in claim 9, wherein said gear train comprises:
    a fan shaped pivotally mounted gear; and
    a pinion gear rotatably meshed with said fan shaped gear, said pinion gear having an eccentric axis of rotation, so that the greater the angular turning movement of said lever, the smaller is the angular turning movement of said index member.

11. Apparatus as defined in claim 9, wherein said rod is bendable, so when said lever has a large angular turning movement, said rod bends to decrease the angular turning movement of said index member.

12. Apparatus as defined in claim 1, wherein said spring means connected to said lever is a tensioned coil spring also connected to a fixed point on said support to maintain said coil spring in tension.

13. Apparatus as defined in claim 12, further comprising a compensating roller rotatably carried by said support, said roller being normally spaced from said coil spring when said lever is in said balanced position, said roller contacting said coil spring to increase tension in said coil spring when the turning angular movement of said lever is sufficiently large.

14. Apparatus as defined in claim 1, wherein said first and second cams are each peripherally spiral in shape; and further comprising two hair springs respectively arranged to urge said first and second cams to rotate to cause said first cam to contact peripherally said transmission member, and to cause said second cam to contact peripherally said stop member.

15. Apparatus as defined in claim 1, further comprising:
- a lifter member contacting said lever and movable between upper and lower positions with respect to said lever;
- a reset lever connected to said lifter member for raising and lowering the same;
- first and second rack gears operatively connected to said reset lever and arranged to rotate said first and second cams respectively when said reset lever is lowered; and
- mechanical means operatively connected to said reset lever for restoring said first named lever to said balanced position.

* * * * *